United States Patent
Horiba et al.

(10) Patent No.: US 11,725,113 B2
(45) Date of Patent: Aug. 15, 2023

(54) DISPERSION, INK COMPOSITION FOR INK JET RECORDING, AND INK JET RECORDING METHOD

(71) Applicant: Seiko Epson Corporation, Tokyo (JP)

(72) Inventors: Koji Horiba, Matsumoto (JP); Koichi Terao, Suwa (JP)

(73) Assignee: SEIKO EPSON CORPORATION

( * ) Notice: Subject to any disclaimer, the term of this patent is extended or adjusted under 35 U.S.C. 154(b) by 323 days.

(21) Appl. No.: 16/937,874

(22) Filed: Jul. 24, 2020

(65) Prior Publication Data

US 2021/0024763 A1 Jan. 28, 2021

(30) Foreign Application Priority Data

Jul. 25, 2019 (JP) .................................. 2019-137148

(51) Int. Cl.
| | | |
|---|---|---|
| *C09D 11/322* | (2014.01) | |
| *C09D 11/107* | (2014.01) | |
| *C08K 5/3437* | (2006.01) | |

(52) U.S. Cl.
CPC .......... *C09D 11/322* (2013.01); *C08K 5/3437* (2013.01); *C09D 11/107* (2013.01)

(58) Field of Classification Search
CPC .... C09D 11/322; C09D 11/107; C08K 5/3437
See application file for complete search history.

(56) References Cited

U.S. PATENT DOCUMENTS

| | | | |
|---|---|---|---|
| 8,857,966 B2 | 10/2014 | Kitagawa et al. | |
| 2009/0220754 A1 | 9/2009 | Yatake | |
| 2009/0233063 A1 | 9/2009 | Yatake et al. | |
| 2020/0190344 A1* | 6/2020 | Koyama et al. ..... | C09D 11/101 |

FOREIGN PATENT DOCUMENTS

| | | | |
|---|---|---|---|
| JP | 2009-215506 A | 9/2009 | |
| JP | 2009-234257 A | 10/2009 | |
| JP | 2009-235386 A | 10/2009 | |
| JP | 2012-251062 A | 12/2012 | |
| JP | 2016-006156 A | 1/2016 | |
| JP | 2018-154829 A | 10/2018 | |
| WO | WO2019044511 A1 * | 3/2019 | ........... C09D 11/101 |

OTHER PUBLICATIONS

Noh et al. Progress in Organic Coatings 74 (2012) 192. (Year: 2011).*

* cited by examiner

*Primary Examiner* — Ling Siu Choi
*Assistant Examiner* — Huihong Qiao
(74) *Attorney, Agent, or Firm* — Harness, Dickey & Pierce, P.L.C.

(57) ABSTRACT

A dispersion contains: a water-insoluble colorant; and acrylic resin particles, where: the acrylic resin particles contain, as a monomer unit, 20 mol % or more of an acrylic blocked isocyanate group based on a total amount of the acrylic resin particles; and the acrylic resin particles have a weight-average molecular weight of 1,000 or more and 1,000,000 or less.

11 Claims, No Drawings

DISPERSION, INK COMPOSITION FOR INK JET RECORDING, AND INK JET RECORDING METHOD

The present application is based on, and claims priority from JP Application Serial Number 2019-137148, filed Jul. 25, 2019, the disclosure of which is hereby incorporated by reference herein in its entirety.

BACKGROUND

1. Technical Field

The present disclosure relates to a dispersion, an ink composition for ink jet recording, and an ink jet recording method.

2. Related Art

An ink jet recording method is a recording method of printing by discharging droplets of an ink composition from nozzles, thereby attaching to a recording medium, such as paper. Such an ink jet recording method is characterized by being able to print high-resolution high-quality images at a high speed and thus has been employed in various technical fields. In recent years, there has been an increasing demand for textile printing on fabrics and printing on films, such as polypropylene. To improve rubbing fastness of images and the like formed on textiles, JP-A-2009-215506, for example, proposes an ink jet ink for textile printing that contains a specific water-dispersible resin and a blocked isocyanate compound as a crosslinker.

However, the ink jet ink for textile printing described in JP-A-2009-215506 had a problem in discharge stability since the viscosity tends to increase as the solids content increases. In addition, there was also a problem of unsatisfactory rubbing fastness. Specifically, JP-A-2009-215506 attempts to improve rubbing fastness by the crosslinking reaction of the blocked isocyanate compound. However, the blocked isocyanate compound exhibits unsatisfactory storage stability and thus readily allows the reaction of the isocyanate group to proceed during storage. Consequently, the isocyanate group had been deactivated in some cases when the ink jet ink for textile printing was used. For this reason, a desirable crosslinking reaction was difficult to be realized.

SUMMARY

The present inventors found that using acrylic resin particles containing a blocked isocyanate group makes it possible to obtain a dispersion with excellent discharge stability and further an ink composition excellent in rubbing fastness of images to be fixed to textiles.

Specifically, a dispersion according to the present disclosure contains: a water-insoluble colorant; and acrylic resin particles, where: the acrylic resin particles contain, as a monomer unit, 20 mol % or more of an acrylic blocked isocyanate group based on a total amount of the acrylic resin particles; and the acrylic resin particles have a weight-average molecular weight of 1,000 or more and 1,000,000 or less.

In the above-described dispersion, a blocking agent of the acrylic blocked isocyanate group may be any of pyrazole, methyl ethyl ketoxime, and caprolactam.

In the above-described dispersion, the acrylic resin particles may have a structure derived from a hydroxyalkyl acrylate in repeating units.

In the above-described dispersion, a content of the acrylic resin particles may be 1% by mass or more and 50% by mass or less based on a total amount of the dispersion.

The above-described dispersion may further contain a dispersant for the colorant.

An ink composition for ink jet recording contains the above-described dispersion.

An ink jet recording method includes an ink attaching step of discharging the above-mentioned ink composition for ink jet recording from a recording head, thereby attaching to a recording medium.

In the above-described ink jet recording method, the recording medium may have hydroxy groups on a surface.

The above-described ink jet recording method may further include, after the ink attaching step, a heating step of heating the recording medium and the ink composition for ink jet recording attached to the recording medium to a heating temperature equal to or higher than a thermal dissociation temperature of the acrylic blocked isocyanate group.

The above-described ink jet recording method may heat, in the ink attaching step, the recording medium and the ink composition for ink jet recording attached to the recording medium to a heating temperature equal to or higher than a thermal dissociation temperature of the acrylic blocked isocyanate group.

In the above-described ink jet recording method, the heating temperature may be 100° C. or higher.

DESCRIPTION OF EXEMPLARY EMBODIMENTS

Dispersion

A dispersion of the present embodiment contains: a water-insoluble colorant; and acrylic resin particles (hereinafter, also simply referred to as "resin (A)"), where: 20 mol % or more of an acrylic blocked isocyanate group, as a monomer unit (hereinafter, simply abbreviated to "blocking agent monomer"), is contained based on a total amount of the acrylic resin particles; and the acrylic resin particles have a weight-average molecular weight of 1,000 or more and 1,000,000 or less.

When the blocking agent monomer of the resin (A) is less than 20 mol %, rubbing fastness is unsatisfactory. When the weight-average molecular weight, as a polystyrene-based weight-average molecular weight by gel permeation chromatography (GPC), is less than 1,000, rubbing fastness is unsatisfactory. Meanwhile, the weight-average molecular weight is more than 1,000,000, an increased viscosity impairs discharge stability and texture.

The above-described dispersion exhibits excellent discharge stability and imparts, to images to be fixed to textiles, excellent wet rubbing fastness.

The viscosity of the dispersion is preferably 0.5 mPa·s or more and 100 mPa·s or less, more preferably 1.0 mPa·s or more and 50 mPa·s or less, and further preferably 1.5 mPa·s or more and 10 mPa·s or less. When the viscosity of the dispersion falls within these ranges, the dispersion exhibits excellent discharge stability.

The viscosity herein is a viscosity measured at 20° C.

Resin (A)

The resin (A) has an acrylic blocked isocyanate group. In the acrylic blocked isocyanate group, the reactivity of the isocyanate group is masked and suppressed by a blocking agent. For this reason, even when a dispersion or an ink composition for ink jet recording that contains the resin (A) is stored for a long time, the reaction of the isocyanate group is suppressed, thereby enhancing storage stability.

Meanwhile, the blocking agent is dissociated from the isocyanate group by heating to a predetermined temperature or higher. In other words, the reactivity of the isocyanate group is unleashed by heating an ink composition for ink jet recording that contains the resin (A) and that has been attached to a recording medium. The isocyanate group then reacts with a hydroxy group to form a covalent urethane bond. For this reason, when a textile, such as cotton, or a film that has hydroxy groups on the surface is used as a recording medium, it is possible to enhance wet rubbing fastness and the like through bonding between the resin (A) and the recording medium.

For the discharge stability of a dispersion containing the resin (A), the blocking agent is preferably dissociated at 60° C. to lower than 180° C., more preferably 70° C. to lower than 170° C., and further preferably 80° C. to lower than 160° C. As a result, it is possible to allow the reaction to proceed satisfactorily in the heating step after printing of the dispersion that contains the resin (A), thereby enhancing wet rubbing fastness.

In view of the above, the blocking agent is preferably any of pyrazole, methyl ethyl ketoxime, and caprolactam and further preferably pyrazole.

Because of the blocking agent of the acrylic blocked isocyanate group, a dispersion excellent in discharge stability and wet rubbing fastness can be obtained.

The resin (A) preferably has, as the copolymerization composition, a structure derived from a hydroxyalkyl acrylate (hereinafter, also simply abbreviated to "hydroxy acrylate") in addition to the acrylic blocked isocyanate group. This is because wet rubbing fastness can be enhanced further through formation of not only urethane crosslinks between a recording medium and the resin (A) but also urethane crosslinks between the resin (A) molecules.

The content of the resin (A) or the acrylic resin particles is preferably 1% by mass or more and 50% by mass or less based on the total amount of the dispersion. Moreover, when the resin (A) includes a hydroxy acrylate, it is possible to obtain a dispersion with excellent wet rubbing fastness due to the reaction with a thermally dissociated isocyanate group after printing and heating.

The production method for the resin (A) is not particularly limited but is preferably an emulsion polymerization method. The emulsion polymerization method herein is a polymerization method including: emulsifying, by using an emulsifier (surfactant) for mixing water with oil, water and a vinyl monomer having an initiation site for radical polymerization to form the state of oil droplets-in-water; adding to the oil droplets a water-soluble initiator as a radical generator and a chain transfer agent for molecular weight control; and heating at a radical generation temperature or higher to allow a radical reaction to proceed in water. In the present embodiment, a blocking agent monomer and a hydroxy acrylate are used as vinyl monomers.

The blocking agent monomer preferably has a monomer structure containing an alkyl group. This is because a urethane crosslink becomes flexible by including an alkyl chain, thereby improving texture and fastness due to crosslinking.

Examples of commercially available blocking agent monomers include, but are not particularly limited to, Karenz® MOI-BP (blocked with pyrazole), Karenz® MOI-BM (blocked with MEKO), Karenz® MOI-CP (blocked with caprolactam), Karenz® AOI-BM (blocked with MEKO), Karenz® AOI-BP (blocked with pyrazole), and Karenz® AOI-CP (blocked with caprolactam) from Showa Denko K. K. Among these monomers, Karenz MOI-BP, whose blocking agent is a pyrazole group, can be suitably used in view of rubbing fastness.

In a similar manner to the blocking agent monomer, by increasing the alkyl chain length of a hydroxy acrylate, a urethane crosslink becomes flexible, thereby improving texture and wet rubbing fastness due to crosslinking. Regarding the alkyl chain length, a $C_{1-20}$ alkyl acrylate is preferable and a $C_{2-10}$ alkyl acrylate is further preferable. Examples include hydroxymethyl (meth)acrylate, hydroxyethyl (meth)acrylate, hydroxypropyl (meth)acrylate, 4-hydroxybutyl (meth)acrylate, 2-hydroxybutyl (meth)acrylate, and hydroxyhexyl (meth)acrylate.

Among these (meth)acrylates, hydroxybutyl (meth)acrylate is preferable in view of wet rubbing fastness.

The molar ratio of the blocking agent monomer/hydroxy acrylate is not particularly limited but is 99/1 to 40/60, further preferably 95/5 to 45/55, and more preferably 90/10 to 50/50 in view of discharge stability.

A water-soluble emulsifier is not particularly limited but preferably prevents separation of water and vinyl monomers after mixing water, the vinyl monomers, and the water-soluble emulsifier to form the state of oil droplets-in-water. As the emulsifier, anionic emulsifiers having a sulfonic acid group or the like, such as Pelex from Kao Corporation and Neogen® from DKS Co. Ltd., are suitably used.

The amount of the water-soluble emulsifier added is in the range of preferably 0.1 to 3.0 (weight ratio) and further preferably 0.3 to 2.0 based on 1.0 for the total amount of the resin (A).

As the initiator, anionic peroxides, such as ammonium persulfate and potassium persulfate, can be suitably used as water-soluble initiators.

The amount of the initiator added is in the range of preferably 0.1 to 3.0 (weight ratio) and more preferably 0.3 to 2.0 based on 1.0 for the total amount of the resin (A). It is possible to decrease the molecular weight by increasing the amount of the initiator without changing the amount of vinyl monomers, or conversely, to increase the molecular weight by decreasing the amount of the initiator.

The chain transfer agent is used for controlling the weight-average molecular weight of an emulsion polymer to a desirable molecular weight of 1,000 to 1,000,000. Examples include mercaptans, carbon tetrachloride, and α-methylstyrene dimer. Among these chain transfer agents, mercaptan chain transfer agents, such as n-octyl mercaptan, n-dodecyl mercaptan, 2-ethylhexxyl 3-mercaptopropionate, n-octyl 3-mercaptopropionate, methoxybutyl 3-mercaptopropionate, 3,3'-thiodipropionic acid, and thioglycolic acid, are suitably used in view of molecular weight control.

The amount of the chain transfer agent added is in the range of preferably 0.01 to 3.0 (weight ratio) and further preferably 0.05 to 2.0 based on 1.0 for the total amount of the resin (A).

The reaction temperature is adjusted depending on the 10-hour half-life temperature of an initiator to be used. In the case of ammonium persulfate having a 10-hour half-life temperature of 62° C., the reaction is performed at 65° C. or higher and lower than 80° C. In the case of potassium persulfate having a 10-hour half-life temperature of 70° C., the reaction is performed at 70° C. or higher and lower than 80° C. In other words, the reaction temperature is preferably a temperature at which polymerization proceeds while generating radicals but without dissociation of a blocking agent of the blocking agent monomer. The reaction temperature is preferably 60° C. or higher and lower than 90° C. and more preferably 70° C. or higher and 80° C. or lower.

The average particle size of the resin (A) is preferably 10 nm or more and 500 nm or less, more preferably 20 nm or more and 400 nm or less, and further preferably 30 nm or more and 300 nm or less from a viewpoint of further effectively and reliably exert the advantageous effects of the present disclosure. When the particle size is large, the resin (A) is readily sedimented, thereby impairing discharge stability. Meanwhile, when the particle size is smaller than nm, the viscosity tends to increase, thereby impairing discharge stability. The average particle size herein is a volume-based one unless otherwise indicated. The particle size may be measured, for example, by a particle size distribution analyzer using a laser diffraction/scattering method as the measurement principle. Exemplary particle size distribution analyzers include a particle size analyzer using a dynamic light scattering method as the measurement principle (for example, Microtrac UPA from Nikkiso Co., Ltd.).

In the dispersion of the present embodiment, the content of the resin (A) is preferably 0.5% by mass or more and 80% by mass or less, more preferably 0.7% by mass or more and 60% by mass or less, and further preferably 1.0% by mass or more and 50% by mass or less based on the total amount of the dispersion (100% by mass). When the amount of the resin falls within the above-mentioned ranges, excellent discharge stability and wet rubbing fastness are achieved.

Water-Insoluble Colorants

Examples of the water-insoluble colorant of the present embodiment include, but are not particularly limited to, pigments and oil-soluble dyes.

Examples of the oil-soluble dyes include, but are not particularly limited to, disperse dyes, vat dyes, and organic solvent-soluble dyes.

The pigments of the present embodiment are not particularly limited and further specific examples include the following.

Exemplary pigments for black include, but are not particularly limited to, carbon black, such as No. 2300, No. 900, MCF 88, No. 33, No. 40, No. 45, No. 52, MA 7, MA 8, MA 100, No. 2200B (all from Mitsubishi Chemical Corporation); Raven 5750, Raven 5250, Raven 5000, Raven 3500, Raven 1255, Raven 700 (all from Columbian Carbon Company); Regal 400R, Regal 330R, Regal 660R, Mogul L, Monarch 700, Monarch 800, Monarch 880, Monarch 900, Monarch 1000, Monarch 1100, Monarch 1300, Monarch 1400 (all from Cabot Japan K. K.); Color Black FW 1, Color Black FW 2, Color Black FW 2V, Color Black FW 18, Color Black FW 200, Color Black S 150, Color Black S 160, Color Black S 170, Printex 35, Printex U, Printex V, Printex 140U, Special Black 6, Special Black 5, Special Black 4A, and Special Black 4 (all from Degussa AG).

Exemplary pigments for white include, but are not particularly limited to, C.I. Pigment White 6, 18, and 21; titanium oxide; zinc oxide; zinc sulfide; antimony oxide; zirconium oxide; and white hollow resin particles and polymer particles.

Exemplary pigments for yellow includes, but are not particularly limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Exemplary pigments for magenta include, but are not particularly limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Exemplary pigments for cyan include, but are not particularly limited to, C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Further, examples of pigments other than the above-described pigments include, but are not particularly limited to, C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The average particle size of the pigment is preferably 50 nm or more and 300 nm or less, more preferably 55 nm or more and 200 nm or less, further preferably 60 nm or more and 150 nm or less, and still further preferably 65 nm or more and 100 nm or less from a viewpoint of further effectively and reliably exert the advantageous effects of the present disclosure. The average particle size herein is a volume-based one unless otherwise indicated. The average particle size may be measured, for example, by a particle size distribution analyzer using a laser diffraction/scattering method as the measurement principle. Exemplary particle size distribution analyzers include a particle size analyzer using a dynamic light scattering method as the measurement principle (for example, Microtrac UPA from Nikkiso Co., Ltd.).

In the dispersion of the present embodiment, the content of the water-insoluble colorant is preferably 1.0% by mass or more and 25.0% by mass or less, more preferably 2.0% by mass or more and 20.0% by mass or less, and further preferably 3.0% by mass or more and 15.0% by mass or less based on 100% by mass for the total amount of the dispersion.

In the dispersion of the present embodiment, the mass ratio of the water-insoluble colorant to the resin (A) [water-insoluble colorant/resin (A)] is preferably 40/60 to 90/10, more preferably 50/50 to 80/20, and further preferably 55/45 to 75/25 in view of discharge stability. When the ratio of the resin (A) increases to the water-insoluble colorant/resin (A) of 39/61, discharge stability deteriorates. Meanwhile, when the ratio of the resin (A) decreases to the water-insoluble colorant/resin (A) of 91/9, wet rubbing fastness deteriorates.

Dispersants for Colorants

An anionic surfactant may be added to the dispersion for stable dispersing of a pigment. Examples of the anionic surfactant include long-chain fatty acid salts, soap, α-sulfonated fatty acid methyl ester salts, alkylbenzene-sulfonic acid salts, alkyl sulfate salts, monoalkyl phosphate salts, α-olefin sulfonate salts, alkylnaphthalene sulfonate salts, naphthalene sulfonate salts, alkane sulfonate salts, polyoxyethylene alkyl ether sulfate salts, sulfosuccinic acid salts, and polyoxyalkylene glycol alkyl ether phosphate salts.

These anionic surfactants may be used alone or in combination.

Water

An ink composition for ink jet recording of the present embodiment contains water. Water is not particularly limited, and examples include pure water, such as deionized water, ultrafiltration water, reverse osmosis water, and distilled water; as well as ultrapure water.

In the dispersion of the present embodiment, the content of water and an organic solvent is preferably 60% by mass or more and 99% by mass or less, more preferably 70% by mass or more and 95% by mass or less, and further preferably 75% by mass or more and 90% by mass or less based on 100% by mass for the total amount of the dispersion.

Ink Composition for Ink Jet Recording

An ink composition for ink jet recording of the present embodiment (hereinafter, also simply referred to as "ink composition") contains the above-described dispersion of the present embodiment.

In the ink composition of the present embodiment, the content of the resin (A) is preferably 0.1% by mass or more and 30% by mass or less, more preferably 0.5% by mass or more and 20% by mass or less, and further preferably 1.0% by mass or more and 10% by mass or less based on 100% by mass for the total amount of the ink composition.

In the ink composition of the present embodiment, the content of the water-insoluble colorant is preferably 0.5% by mass or more and 20.0% by mass or less, more preferably 1.0% by mass or more and 15.0% by mass or less, and further preferably 2.0% by mass or more and 10.0% by mass or less based on 100% by mass for the total amount of the ink composition.

The mass ratio of the water-insoluble colorant to the resin (A) preferably falls within the range in the above-described dispersion.

Water-Soluble Organic Solvents

The ink composition of the present embodiment may further contain a water-soluble organic solvent in view of viscosity adjustment and the moisture retention effect.

Examples of the water-soluble organic solvent include, but are not particularly limited to, lower alcohols (methanol, ethanol, 1-propanol, isopropanol, 1-butanol, 2-butanol, isobutanol, 2-methyl-2-propanol, and 1,2-hexanediol, for example), glycols (ethylene glycol, diethylene glycol, triethylene glycol, tetraethylene glycol, pentaethylene glycol, propylene glycol, dipropylene glycol, and tripropylene glycol, for example), glycerol, acetins (monoacetin, diacetin, and triacetin, for example), glycol derivatives (triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether, for example), 1-methyl-2-pyrrolidone, β-thiodiglycol, and sulfolane. These water-soluble organic solvents may be used alone or in combination.

The content of the water-soluble organic solvent is preferably 1.0% by mass or more and 50% by mass or less, more preferably 5.0% by mass or more and 40% by mass or less, and further preferably 10% by mass or more and 30% by mass or less based on 100% by mass for the total amount of the ink composition.

Surfactants

The ink composition of the present embodiment preferably further contains a surfactant from a viewpoint of achieving stable discharge of the ink composition by an ink jet recording mode as well as appropriate control of permeation of the ink composition. Examples of the surfactant include, but are not particularly limited to, acetylenic glycol surfactants (2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol, for example), fluorosurfactants (perfluoroalkylsulfonate salts, perfluoroalkylcarboxylate salts, perfluoroalkyl phosphates, a perfluoroalkyl-containing polyethylene oxide, perfluoroalkyl betaines, and perfluoroalkylamine oxide compounds, for example), and silicone surfactants (polysiloxane compounds and polyether-modified organosiloxanes, for example).

From a viewpoint of further effectively and reliably exert the advantageous effects of the present disclosure, the content of the surfactant is preferably 0.1% by mass or more and 5.0% by mass or less, more preferably 0.2% by mass or more and 3.0% by mass or less, and further preferably 0.2% by mass or more and 1.0% by mass or less based on 100% by mass for the total amount of the ink composition.

The ink composition of the present embodiment may appropriately contain, as other additives, various additives, such as softening agents, waxes, dissolution aids, viscosity modifiers, antioxidants, preservatives, fungicides, corrosion inhibitors, and chelating agents (ethylenediaminetetraacetic acid sodium salt, for example) for scavenging metal ions that affect dispersing.

The ink composition is not particularly limited but can be prepared as follows, for example. The above-described respective components are mixed in a suitable order, and then, impurities are removed as necessary through filtration or the like. As the mixing method for the respective components, a method of successively adding components to a vessel equipped with a stirrer, such as a mechanical stirrer or a magnetic stirrer, followed by stirring and mixing may be employed.

Physical Properties of Ink Composition

The ink composition of the present embodiment has a viscosity at 25° C. and a shear rate of 10 (1/s) of preferably less than 0.03 Pa·s, more preferably less than 0.01 Pa·s, and further preferably less than 0.005 Pa·s. Meanwhile, the viscosity of the dispersion is not particularly limited but is 0.0001 Pa·s or more at 25° C. and a shear rate of 10 (1/s), for example.

The ink composition of the present embodiment has a viscosity at 25° C. and a shear rate of 1,000 (1/s) of preferably less than 0.03 Pa·s, more preferably less than 0.01 Pa·s, and further preferably less than 0.005 Pa·s. Meanwhile, the viscosity of the dispersion is not particularly limited but is 0.0001 Pa·s or more at 25° C. and a shear rate of 1,000 (1/s), for example.

The above-mentioned viscosity is a value measured at 25° C. by using an E-type viscometer (TVE-22 from Toki Sangyo Co., Ltd., for example).

Ink Jet Recording Method

An ink jet recording method of the present embodiment includes an ink attaching step of discharging the above-described ink composition of the present embodiment from a recording head, thereby attaching to a recording medium.

The ink jet recording method is a recording method in which ink compositions are used by loading an ink jet apparatus therewith. Examples of the ink jet apparatus include, but are not particularly limited to, a drop-on-demand ink jet apparatus. Such a drop-on-demand ink jet apparatus encompasses: an apparatus that adopts an ink jet textile printing method using piezoelectric elements arranged in a head; and an apparatus that adopts an ink jet textile printing method using thermal energy from a heater or the like of heat-generating resistance elements arranged in a head, for example. An apparatus that adopts either mode may be used. Hereinafter, each step of the ink jet recording method will be described in detail.

Ink Attaching Step

In the ink attaching step of the present embodiment, for example, an ink composition is discharged on the surface (image forming region) of a recording medium by an ink jet mode, thereby attaching to the recording medium while forming an image. Here, discharge conditions may be appropriately determined depending on the physical properties of an ink composition to be discharged.

Recording Media

A recording medium preferably has hydroxy groups on the surface from a viewpoint of improving wet rubbing fastness. Wet rubbing fastness and texture can be improved presumably because the hydroxy groups of the recording medium and the isocyanate groups of the resin (A) contained in the ink composition react each other, thereby achieving firm fixing to the recording medium. However, this factor is not limiting.

Examples of the recording medium include, but are not particularly limited to, textiles, paper, plastics, and plastic-coated paper substrates. As these recording media, those having hydroxy groups on the surface are used.

Examples of the textiles include, but are not particularly limited to, those formed from natural fibers and synthetic fibers, such as silk, cotton, wool, nylons, polyesters, and rayon. The textiles may be formed from one type of fibers or two or more blended fibers.

Examples of the paper include, but are not particularly limited to, plain paper, ink jet paper, art paper, coated paper, and cast-coated paper. The ink jet paper may have an ink absorbing layer formed from silica particles and/or alumina particles or an ink absorbing layer formed from a hydrophilic polymer having hydroxy groups, such as polyvinyl alcohol.

Examples of the plastics include, but are not particularly limited to, films and plates of plastics, such as polyvinyl chloride, polyethylene, polypropylene, polyethylene terephthalate, polycarbonates, polystyrene, and polyurethanes.

Examples of the plastics to be applied to paper substrates include, but are not particularly limited to, polyvinyl chloride, polyethylene, polypropylene, polyethylene terephthalate, polycarbonates, polystyrene, and polyurethanes.

These recording media may be used alone or in combination.

When plastics or plastic-coated paper substrates are used as recording media, those that have been treated for introducing hydroxy groups into the surfaces are preferably used.

Examples of the treatment for introducing hydroxy groups include, but are not particularly limited to, corona treatment and the treatment of providing an ink receiving layer by using a material having hydroxy groups.

Examples of the material having hydroxy groups include, but are not particularly limited to, polyvinyl alcohol; starch; cellulose derivatives, such as carboxymethyl cellulose; casein; and gelatin. These materials may be used alone or in combination.

Heating Step

The ink jet recording method of the present embodiment preferably includes a heating step simultaneously with or after the ink attaching step. The heating temperature in the heating step is preferably equal to or higher than a temperature at which the blocked isocyanate group of the resin (A) is thermally dissociated to generate an isocyanate group. The blocking agent is preferably methyl ethyl ketoxime, pyrazole, or caprolactam, whose thermal dissociation temperature is 100° C. or higher. In other words, the temperature in the heating step is preferably set to 100° C. or higher to generate isocyanate groups and to form sufficient urethane bonds with hydroxy groups of a recording medium.

By including the heating step, it is possible to form a covalent bond through the reaction between a hydroxy group on the surface of a recording medium and an isocyanate group of the resin (A), thereby better fixing a water-insoluble colorant to the recording medium. Exemplary heating processes include, but are not particularly limited to, the HT process (high-temperature steaming process), the HP process (high-pressure steaming process), and the thermosol process.

Moreover, in the heating step, the ink composition-attached surface of the recording medium may or may not be subjected to pressure treatment. Exemplary heating processes without pressure treatment of the ink composition-attached surface of the recording medium include oven drying (pressing-free process in a conveyor over, batch oven, or the like). By including such a heating step, the productivity of recorded articles is further enhanced. Meanwhile, exemplary heating processes with pressure treatment of the ink composition-attached surface of the recording medium include, but are not particularly limited to, heat pressing and wet-on-dry. The term "pressure" herein means applying pressure to a recording medium by bringing into contact with a solid.

The heating temperature during heat treatment is preferably 100° C. or higher, more preferably 120° C. or higher and 180° C. or lower, and further preferably 130° C. or higher and 170° C. or lower from a viewpoint of further effectively and reliably exert the advantageous effects of the present disclosure.

When textiles are used as recording media, the heating temperature during heat treatment is preferably 100° C. or higher and 180° C. or lower, more preferably 120° C. or higher and 180° C. or lower, and further preferably 130° C. or higher and 170° C. or lower from a viewpoint of further effectively and reliably exert the advantageous effects of the present disclosure. The heating time is not particularly limited but is 30 seconds or more and 20 minutes or less, for example.

When plastics or plastic-coated paper substrates are used as recording media, the temperature during heat treatment is preferably 100° C. or higher, more preferably 100° C. or higher and 150° C. or lower, further preferably 100° C. or higher and 130° C. or lower, and still further preferably 100° C. or higher and 120° C. or lower from a viewpoint of further effectively and reliably exert the advantageous effects of the present disclosure as well as suppressing thermal deformation of the plastics. The heating time is not particularly limited but is 30 seconds or more and 20 minutes or less, for example.

The heating step may be performed simultaneously with the ink attaching step.

Washing Step

When a recording medium is a textile, the ink jet recording method of the present embodiment may further include, after the heating step, a washing step of washing the ink composition-attached recording medium. Through the washing step, a water-insoluble colorant unattached to fibers can be effectively removed. The washing step may be performed by using water, for example, and soaping may be performed as necessary. Exemplary soaping processes include, but are not particularly limited to, a process of washing off unfixed pigment with a hot soap solution or the like.

As in the foregoing, it is possible to obtain recorded articles, such as printed textiles, in which images of the above-described ink composition have been formed on recording media including textiles.

Hereinafter, the present disclosure will be described in further detail by means of Examples and Comparative Examples. However, the present disclosure is by no means limited to the following Examples.

Example 1

Preparation of Acrylic Resin Particle Dispersion 1

To an emulsifying tank, 20.0 parts by mass of Karenz® MOI-BM from Showa Denko K. K., 0.8 parts by mass of Neogen® S-20F from DKS Co. Ltd. as an emulsifier, 1.7 parts by mass of ammonium persulfate from Wako Pure Chemical Industries, Ltd., 20.0 parts by mass of deionized water, and 0.8 parts by mass of dodecanethiol were fed and emulsified for 30.0 minutes to form an emulsion. To a reaction tank, 0.2 parts by mass of Neogen® S-20F from DKS Co. Ltd., 0.3 parts by mass of ammonium persulfate, 0.2 parts by mass of dodecanethiol, and 60.0 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 95.0 parts by mass of an acrylic resin particle dispersion 1 with a solids content of 20.0%.

Preparation of Color Dispersion 1

To a bead mill, 80.0 parts by mass of zirconia beads, 10.0 parts by mass of PB 15:3 as a water-insoluble colorant, 40.0 parts by mass of pure water, and 1.0 part by mass of Neogen® S-20F as a surfactant were fed and pulverized for 1.0 hour. Subsequently, the beads were separated from the resulting mixture to yield a pigment dispersion 1. To a 50.0 mL Aiboi® (plastic bottle), 10.0 parts by mass of the pigment dispersion 1 and 10.0 parts by mass of the acrylic resin particle dispersion 1 were fed and stirred for 30.0 minutes to yield a color dispersion 1.

Example 2

Preparation of Acrylic Resin Particle Dispersion 2

To an emulsifying tank, 20.0 parts by mass of Karenz® MOI-BP from Showa Denko K. K., 0.8 parts by mass of Neogen® S-20F from DKS Co. Ltd. as an emulsifier, 0.4 parts by mass of ammonium persulfate from Wako Pure Chemical Industries, Ltd., and 20.0 parts by mass of deionized water were fed and emulsified for 30 minutes to form an emulsion. To a reaction tank, 0.2 parts by mass of Neogen® S-20F from DKS Co. Ltd., 0.1 parts by mass of ammonium persulfate from Wako Pure Chemical Industries, Ltd., 0.5 parts by mass of dodecanethiol, and 60.0 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 95.0 parts by mass of an acrylic resin particle dispersion 2 with a solids content of 20.0%.

Preparation of Color Dispersion 2

To a bead mill, 80.0 parts by mass of zirconia beads, 10.0 parts by mass of PV 19 from Dainichiseika Color & Chemicals Mfg. Co., Ltd. as a water-insoluble colorant, 40.0 parts by mass of pure water, and 1.0 part by mass of Neogen® S-20F as a surfactant were fed and pulverized for 1.0 hour. Subsequently, the beads were separated from the resulting mixture to yield a pigment dispersion 2. To a 50.0 mL Aiboi® (plastic bottle), 10.0 parts by mass of the pigment dispersion and 10.0 parts by mass of the acrylic resin particle dispersion 2 were fed and stirred for 30.0 minutes to yield a color dispersion 2.

Example 3

Preparation of Acrylic Resin Particle Dispersion 3

To an emulsifying tank, 20.0 parts by mass of Karenz® MOI-CP from Showa Denko K. K., 0.8 parts by mass of Neogen® S-20F from DKS Co. Ltd. as an emulsifier, 2.5 parts by mass of ammonium persulfate from Wako Pure Chemical Industries, Ltd., and 20.0 parts by mass of deionized water were fed and emulsified for 30.0 minutes to form an emulsion. To a reaction tank, 0.2 parts by mass of Neogen® S-20F from DKS Co. Ltd., 0.5 parts by mass of ammonium persulfate from Wako Pure Chemical Industries, Ltd., 2.0 parts by mass of dodecanethiol, and 60.0 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 95.0 parts by mass of an acrylic resin particle dispersion 3 with a solids content of 20.0%.

Preparation of Color Dispersion 3

To a bead mill, 80.0 parts by mass of zirconia beads, 10.0 parts by mass of PY 180 from BASF SE as a water-insoluble colorant, 40.0 parts by mass of pure water, and 1.0 part by mass of Neogen® S-20F as a surfactant were fed and pulverized for 1.0 hour. Subsequently, the beads were separated from the resulting mixture to yield a pigment dispersion 3. To a 50.0 mL Aiboi® (plastic bottle), 10.0 parts by mass of the pigment dispersion 3 and 10.0 parts by mass of the acrylic resin particle dispersion 3 were fed and stirred for 30.0 minutes to yield a color dispersion 3.

Example 4

Preparation of Acrylic Resin Particle Dispersion 4

To an emulsifying tank, 16.0 parts by mass of Karenz® MOI-BP from Showa Denko K. K., 0.8 parts by mass of Neogen® S-20F from DKS Co. Ltd. as an emulsifier, 4.0 parts by mass of 2-hydroxyethyl acrylate from Tokyo Chemical Industry Co., Ltd., 0.3 parts by mass of ammonium persulfate from Wako Pure Chemical Industries, Ltd., 0.2 parts by mass of dodecanethiol, and 20.0 parts by mass of deionized water were fed and emulsified for 30.0 minutes to form an emulsion. To a reaction tank, 0.2 parts by mass of Neogen® S-20F from DKS Co. Ltd., 0.1 parts by mass of ammonium persulfate from Wako Pure Chemical Industries, Ltd., 0.1 parts by mass of dodecanethiol from Tokyo Chemical Industry Co., Ltd., and 60 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 95.0 parts by mass of an acrylic resin particle dispersion 4 with a solids content of 20.0%.

Preparation of Color Dispersion 4

To a bead mill, 80.0 parts by mass of zirconia beads, 10.0 parts by mass of CB from Mitsubishi Chemical Corporation as a water-insoluble colorant, 40.0 parts by mass of pure water, and 1.0 part by mass of Neogen® S-20F as a surfactant were fed and pulverized for 1.0 hour. Subsequently, the beads were separated from the resulting mixture to yield a pigment dispersion 4. To a 50.0 mL Aiboi® (plastic bottle), 10.0 parts by mass of the pigment dispersion 4 and 10.0 parts by mass of the acrylic resin particle dispersion 4 were fed and stirred for 30.0 minutes to yield a color dispersion 4.

Example 5

Preparation of Acrylic Resin Particle Dispersion 5

To an emulsifying tank, 10.0 parts by mass of Karenz® MOI-BP from Showa Denko K. K., 0.8 parts by mass of Neogen® S-20F from DKS Co. Ltd. as an emulsifier, 10.0 parts by mass of 3-hydroxypropyl acrylate from Tokyo Chemical Industry Co., Ltd., 0.2 parts by mass of ammonium persulfate from Wako Pure Chemical Industries, Ltd., 0.1 parts by mass of dodecanethiol, and 20.0 parts by mass of deionized water were fed and emulsified for 30.0 minutes to form an emulsion. To a reaction tank, 0.2 parts by mass of Neogen® S-20F from DKS Co. Ltd., 0.05 parts by mass of ammonium persulfate from Wako Pure Chemical Industries, Ltd., 0.01 parts by mass of dodecanethiol from Tokyo Chemical Industry Co., Ltd., and 60.0 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 95.0 parts by mass of an acrylic resin particle dispersion 5 with a solids content of 20.0%.

Preparation of Color Dispersion 5

To a bead mill, 80.0 parts by mass of zirconia beads, 10.0 parts by mass of PB 15:3 from BASF SE as a water-insoluble colorant, 40.0 parts by mass of pure water, and 1.0 part by mass of Neogen® S-20F as a surfactant were fed and pulverized for 1.0 hour. Subsequently, the beads were separated from the resulting mixture to yield a pigment dispersion 5. To a 50.0 mL Aiboi® (plastic bottle), 10.0 parts by mass of the pigment dispersion 5 and 10.0 parts by mass of the acrylic resin particle dispersion 5 were fed and stirred for 30.0 minutes to yield a color dispersion 5.

Example 6

Preparation of Color Dispersion 6

An acrylic resin particle dispersion 6 was obtained in a similar manner to Example 5 except for using: Karenz AOI-BP in place of Karenz MOI-BP used for the color dispersion 5 described in Example 5; 4-hydroxybutyl acrylate in place of 3-hydroxypropyl acrylate; and Pelex CS from Kao Corporation in place of Neogen® S-20F as a surfactant. Further, a color dispersion 6 was prepared in a similar manner to the color dispersion 5.

Comparative Example 1

Preparation of Acrylic Resin Particle Dispersion 7

To an emulsifying tank, 20.0 parts by mass of Karenz® AOI from Showa Denko K. K., 0.8 parts by mass of Neogen® S-20F from DKS Co. Ltd. as an emulsifier, 0.85 parts by mass of ammonium persulfate from Wako Pure Chemical Industries, Ltd., and 20.0 parts by mass of deionized water were fed and emulsified for 30.0 minutes to form an emulsion. However, an acrylic resin particle dispersion 7 was not obtained due to aggregation over time.

Preparation of Color Dispersion 7

Due to the above-mentioned aggregation, a color dispersion 7 was not obtained.

Comparative Example 2

Preparation of Acrylic Resin Particle Dispersion 8

To an emulsifying tank, 18.0 parts by mass of styrene from Tokyo Chemical Industry Co., Ltd., 2.0 parts by mass of Karenz® MOI-BM from Showa Denko K. K., 0.8 parts by mass of Neogen® S-20F from DKS Co. Ltd. as an emulsifier, 2.0 parts by mass of ammonium persulfate from Wako Pure Chemical Industries, Ltd., 1.0 part by mass of dodecanethiol from Tokyo Chemical Industry Co., Ltd., and 20.0 parts by mass of deionized water were fed and emulsified for 30.0 minutes to form an emulsion. To a reaction tank, 0.2 parts by mass of Neogen® S-20F from DKS Co. Ltd., 1.0 part by mass of ammonium persulfate, 0.5 parts by mass of dodecanethiol from Tokyo Chemical Industry Co., Ltd., and 60.0 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 95.0 parts by mass of an acrylic resin particle dispersion 8 with a solids content of 20.0%.

Preparation of Color Dispersion 8

To a bead mill, 80.0 parts by mass of zirconia beads, 10.0 parts by mass of PB 15:3 as a water-insoluble colorant, 40.0 parts by mass of pure water, and 1.0 part by mass of Neogen® S-20F as a surfactant were fed and pulverized for 1.0 hour. Subsequently, the beads were separated from the resulting mixture to yield a pigment dispersion 8. To a 50.0 mL Aiboi® (plastic bottle), 10.0 parts by mass of the pigment dispersion 8 and 10.0 parts by mass of the acrylic resin particle dispersion 8 were fed and stirred for 30.0 minutes to yield a color dispersion 8.

Comparative Example 3

Preparation of Acrylic Resin Particle Dispersion 9

To an emulsifying tank, 20.0 parts by mass of styrene from Tokyo Chemical Industry Co., Ltd., 0.8 parts by mass of Neogen® S-20F from DKS Co. Ltd. as an emulsifier, 2.0 parts by mass of ammonium persulfate from Wako Pure Chemical Industries, Ltd., 1.0 part by mass of dodecanethiol from Tokyo Chemical Industry Co., Ltd., and 20.0 parts by mass of deionized water were fed and emulsified for 30.0 minutes to form an emulsion. To a reaction tank, 0.2 parts by mass of Neogen® S-20F from DKS Co. Ltd., 1.0 part by mass of ammonium persulfate, 0.5 parts by mass of dodecanethiol from Tokyo Chemical Industry Co., Ltd., and 60.0 g of deionized water were fed and stirred. The emulsion was added dropwise over 3.0 hours to the reaction tank heated to 70.0° C. and further aged at 70.0° C. for 2.0 hours. After the end of the reaction, the resulting mixture was filtered through a 90.0 μm mesh to yield 90.0 parts by mass of an acrylic resin particle dispersion 9 with a solids content of 20.0%. The resulting dispersion was freeze-dried to yield 18.0 parts by mass of lyophilizate of an acrylic resin particle dispersion 9.

Preparation of Color Dispersion 9

To a bead mill, 80.0 parts by mass of zirconia beads, 10.0 parts by mass of PB 15:3 as a water-insoluble colorant, 10.0 parts by mass of pure water, and 1.0 part by mass of Neogen® S-20F as a surfactant were fed and pulverized for 1.0 hour. Subsequently, the beads were separated from the resulting mixture to yield a pigment dispersion 9. To a 50.0 mL Aiboi® (plastic bottle), 10.0 parts by mass of the pigment dispersion 9 and 20.0 parts by mass of the lyophilizate of acrylic resin particle dispersion 9 were fed and stirred for 30.0 minutes to yield a color dispersion 9.

Table 1 below shows the prepared color dispersions.

from the constant-temperature chamber and left to cool to 25° C. In the same manner as the above-described particle size distribution measurement, a volume-based particle size distribution D2 (50.0%) was measured. A difference ΔD (50.0%) between the above-mentioned volume-based particle size distribution D1 (50.0%) and D2 (50.0%) was

TABLE 1

| | Color dispersion | Acrylic resin dispersion | Resin (A) composition (mass %) | | | | Water-insoluble Colorant | Dispersant | Weight-average molecular weight | Particle size |
|---|---|---|---|---|---|---|---|---|---|---|
| | | | Blocking agent monomer | | Hydroxy acrylate | | Colorant | for colorant | Mw | D50(nm) |
| Ex. 1 | Color dispersion 1 | Acrylic resin particle dispersion 1 | Karenz MOI-BM | 100 | — | 0 | PB15:3 | Neogen S-20F | 200000 | 130 |
| Ex. 2 | Color dispersion 2 | Acrylic resin particle dispersion 2 | Karenz MOI-BP | 100 | — | 0 | PV19 | Neogen S-20F | 350000 | 80 |
| Ex. 3 | Color dispersion 3 | Acrylic resin particle dispersion 3 | Karenz MOI-CP | 100 | — | 0 | PY180 | Neogen S-20F | 50000 | 90 |
| Ex. 4 | Color dispersion 4 | Acrylic resin particle dispersion 4 | Karenz MOI-BP | 80 | 2-Hydroxyethyl acrylate | 20 | CB | Neogen S-20F | 400000 | 200 |
| Ex. 5 | Color dispersion 5 | Acrylic resin particle dispersion 5 | Karenz MOI-BP | 50 | 3-Hydroxypropyl acrylate | 50 | PB15:3 | Neogen S-20F | 700000 | 300 |
| Ex. 6 | Color dispersion 6 | Acrylic resin particle dispersion 6 | Karenz AOI-BP | 50 | 4-Hydroxybutyl acrylate | 50 | PB15:3 | Pelex CS | 700000 | 300 |
| Comp. Ex. 1 | Color dispersion 7 | Acrylic resin particle dispersion 7 | Karenz AOI | 100 | — | 0 | — | Neogen S-20F | — | — |
| Comp. Ex. 2 | Color dispersion 8 | Acrylic resin particle dispersion 8 | Karenz MOI-BM | 10 | (Styrene) | 90 | PB15:3 | Neogen S-20F | 20000 | 120 |
| Comp. Ex. 3 | Color dispersion 9 | Acrylic resin particle dispersion 9 | Styrene | 100 | — | 0 | PB15:3 | Neogen S-20F | 200000 | 60 |

Ink compositions were obtained by mixing each of the prepared color dispersions of the Examples and the Comparative Examples with the components shown in Table 2. In the rows of the components in Table 2, the mark dash represents no addition of the corresponding components.

The obtained ink compositions were subjected to ink jet recording by the following method and evaluated.

Evaluation Methods

Solid Image Formation by Ink Jet Recording Method

Each ink composition was attached to a textile by an ink jet recording method using a modified machine (including a textile fixing means to enable recording on textiles) of an ink jet recording apparatus (product name: PX-G930 from Seiko Epson Corporation). As the recording condition, a solid image was recorded at an attached amount of 15 mg/inch$^2$. As just described, ink jet recording on a textile was performed. Here, the term "solid image" means an image in which dots are recorded in all the pixels, which are the smallest recording unit regions specified by recording resolution.

Subsequently, the ink composition was fixed to a textile through heat treatment using a heat press at 160° C. for 1.0 minute. A printed textile (printed with an ink) in which an image had been formed on the textile was thus produced.

The discharge stability was evaluated through the following storage stability test as well as discharge stability test.

Storage Stability Test

As an indicator of the storage stability of ink, the particle size distribution measurement was performed after storing at 60.0° C. for 5 days. Specifically, an ink was sealed in a 30.0 mL vial and placed in a constant-temperature chamber adjusted to 60.0° C. for 5 days. The vial was then taken out calculated and evaluated in accordance with the following criteria. The results are shown in Table 2.

Evaluation Criteria

A: ΔD (50.0%) of less than 10.0% of D1 (50.0%)

B: ΔD (50.0%) of 10.0% or more and less than 30.0% of D1 (50.0%)

C: ΔD (50.0%) of 30.0% or more and less than 40.0% of D1 (50.0%)

D: ΔD (50.0%) of 40.0% or more of D1 (50.0%)

Discharge Stability Test

As an indicator of the discharge stability of ink, a discharge stability test was performed through a solid image forming process by the above-described ink jet recording method. The printing environment was set to 35.0° C. and 55.0% RH (relative humidity). Immediately before the start of the test, all the discharge nozzles of an ink jet head were confirmed to discharge normally through printing of a nozzle check pattern. Subsequently, under the above-mentioned conditions, continuous printing was performed. Immediately after continuous printing for 180.0 minutes, a nozzle check pattern was printed again to count the number of discharge nozzles that failed to discharge normally (the number of nozzles in discharge failure). A ratio of the number of nozzles in discharge failure to the total number of discharge nozzles was calculated and evaluated in accordance with the following criteria. The results are shown in Table 2.

Evaluation Criteria

A: no nozzle in discharge failure

B: ratio of nozzles in discharge failure of 10.0% or less

C: ratio of nozzles in discharge failure of more than 10.0%

Wet Rubbing Fastness (Fabrics)

Each printed textile was subjected to reciprocating rubbing of 100.0 times by using a Gakushin friction fastness tester (product name: AB-301 from Tester Sangyo Co., Ltd.) under conditions of a weight of 200.0 g and a speed of 10.0 cm/s. Subsequently, the white cloth for JIS dye fastness test (3-1 in accordance with JIS L 0803: 2011) was impregnated with pure water to measure an optical density value of staining (hereinafter, also referred to as "OD value of staining"), and wet rubbing fastness was evaluated in accordance with the following evaluation criteria. A lower OD value of staining indicates better wet rubbing fastness. The results are shown in Table 2.

Evaluation Criteria

A: OD value of staining of 0.15 or less
B: OD value of staining of more than 0.15 and 0.20 or less
C: OD value of staining of more than 0.20 and 0.25 or less
D: OD value of staining of more than 0.25 and 0.30 or less
E: OD value of staining of more than 0.30

Texture

The texture was evaluated as the following five grades through sensory evaluation of each printed textile by hand tough.

Evaluation Criteria

A: soft and indistinguishable boundary between printed surface and textile
B: soft but distinguishable boundary between printed surface and textile
C: not stiff but clearly distinguishable boundary between printed surface and textile
D: stiff and slightly hard touch
E: stiff and hard touch enhanced presumably because a reduced solids content in the ink composition lowers the viscosity of the ink composition.

Wet rubbing fastness is evaluated as B in Examples 1 to 3 and as A in Examples 4 to 6. This is presumably because the blocked isocyanate of the resin (A) undergoes thermal dissociation by heating at 100° C. or higher to generate isocyanate groups and form urethane bonds between the resin (A) and the hydroxy groups of a textile. In addition, presumably because the urethane crosslinking strength is effectively enhanced by increasing the molecular weight of the resin (A) before crosslinking as well as crosslinking is promoted by increasing the concentration of isocyanate groups in the resin (A) to 20.0% or more. Further, by including a structure derived from a hydroxy acrylate in repeating units, wet rubbing fastness is enhanced presumably because not only urethane covalent bonds are formed through reactions between isocyanate groups and hydroxy groups of a substrate but also a three-dimensional network structure is formed through promoted urethane crosslinking between heat melted resin molecules.

Texture is evaluated as C in Examples 1 to 3, as B in Example 4, and as A in Examples 5 and 6. This is presumably because the crosslinking density is high in Examples 1 to 3 due to a homopolymer having blocked isocyanate groups whereas a low crosslinking density improves texture in Examples 4 to 6 in which a hydroxy acrylate is copolymerized. In addition, a further low crosslinking density presumably improves texture in Examples 5 and 6 in which the alkyl chain length is long.

Hereinafter, the details derived from the embodiment will be described.

TABLE 2

| | Component (mass %) | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Color dispersion | Color dispersion 1 | 40.0 | — | — | — | — | — | — | — | — |
| | Color dispersion 2 | — | 40.0 | — | — | — | — | — | — | — |
| | Color dispersion 3 | — | — | 40.0 | — | — | — | — | — | — |
| | Color dispersion 4 | — | — | — | 40.0 | — | — | — | — | — |
| | Color dispersion 5 | — | — | — | — | 40.0 | — | — | — | — |
| | Color dispersion 6 | — | — | — | — | — | 40.0 | — | — | — |
| | Color dispersion 7 | — | — | — | — | — | — | 40.0 | — | — |
| | Color dispersion 8 | — | — | — | — | — | — | — | — | — |
| | Color dispersion 9 | — | — | — | — | — | — | — | 40.0 | 40.0 |
| Others | Diethylene glycol | 10.0 | 10.0 | 10.0 | 10.0 | 10.0 | — | 10.0 | 10.0 | 10.0 |
| | Polytetramethylene glycol ether | — | — | — | — | — | 10.0 | — | — | — |
| | BYK-348 | 0.3 | 0.3 | 0.3 | 0.3 | 0.3 | 0.3 | 0.3 | 0.3 | 0.3 |
| | Sodium carboxymethyl cellulose | 1.0 | 1.0 | 1.0 | 1.0 | 1.0 | 1.0 | 1.0 | 1.0 | 1.0 |
| | Dimethylaminoethanol | 1.0 | 1.0 | 1.0 | 1.0 | 1.0 | 1.0 | 1.0 | 1.0 | 1.0 |
| | 1,2-Hexanediol | 3.0 | 3.0 | 3.0 | 3.0 | 3.0 | 3.0 | 3.0 | 3.0 | 3.0 |
| | Deionized water | balance | balance | balance | balance | balance | balance | balance | balance | balance |
| | Total | 100.0 | 100.0 | 100.0 | 100.0 | 100.0 | 100.0 | 100.0 | 100.0 | 100.0 |
| Evaluation results | Storage stability test | A | A | A | A | A | A | N.A. | B | D |
| | Discharge stability test | A | A | A | A | A | A | N.A. | B | C |
| | Wet rubbing fastness | B | B | B | A | A | A | N.A. | E | E |
| | Texture | C | C | C | B | A | A | N.A. | C | D |

According to the present embodiment, it is possible to provide a dispersion that exhibits excellent discharge stability and that imparts to textiles excellent wet rubbing fastness, as well as an ink composition for ink jet recording and an ink jet recording method using the dispersion.

As shown in Table 2, all items of discharge stability are evaluated as A in Examples 1 to 6. This is presumably because the viscosity is lowered despite a high molecular weight by forming the resin (A) as particles rather than an aqueous resin solution. Moreover, discharge stability is A dispersion contains: a water-insoluble colorant; and acrylic resin particles, where: the acrylic resin particles contain, as a monomer unit, 20 mol % or more of an acrylic blocked isocyanate group based on a total amount of the acrylic resin particles; and the acrylic resin particles have a weight-average molecular weight of 1,000 or more and 1,000,000 or less.

According to this constitution, storage stability and discharge stability are enhanced by using, in a dispersion to be contained in an ink composition for ink jet recording, a resin protected with blocked isocyanate groups and acrylic resin particles having a uniform particle size distribution. Moreover, by subjecting an ink composition for ink jet recording containing such a dispersion to printing on a recording medium and a drying reaction, the blocked isocyanate groups undergo thermal dissociation to generate isocyanate groups and form urethane bonds with hydroxy groups of cotton or the like. Consequently, it is possible to enhance wet rubbing fastness. Further specifically, the acrylic resin particles can be synthesized as particles having a uniform particle size distribution (monodispersed particles) by an emulsion polymerization method, thereby lowering the viscosity. In addition, monodispersed particles tend to melt at the same temperature during heat melting. As a result, storage stability is enhanced since the particles do not melt until a predetermined temperature whereas wet rubbing fastness is enhanced by uniform melting and reacting during heat melting.

Here, a weight-average molecular weight can be increased to 1,000,000 by an emulsion polymerization method. By increasing the weight-average molecular weight, the acrylic resin particles increase the chain length and are readily entangled with fibers of a textile, thereby enhancing wet rubbing fastness. In other words, despite a high molecular weight, the viscosity is lower than that known in the art. Accordingly, it is possible to achieve both discharge stability and wet rubbing fastness.

The acrylic resin particles include, as a monomer unit, as much as 20 mol % or more of an acrylic blocked isocyanate group based on the total amount of the acrylic resin particles. Accordingly, the blocked isocyanate group is more than that included in a resin known in the art. As a result, it is possible to increase the crosslinking density with hydroxy groups of a textile or the like, thereby enhancing wet rubbing fastness compared to that known in the art.

In the above-described dispersion, a blocking agent of the acrylic blocked isocyanate group is preferably any of pyrazole, methyl ethyl ketoxime, and caprolactam.

According to this constitution, since the thermal dissociation temperatures of pyrazole, methyl ethyl ketoxime, and caprolactam are 100° C. to 180° C., their reactions can be conducted in this temperature range. Accordingly, storage stability is enhanced, and discharge stability is also enhanced, as a result.

In the above-described dispersion, the acrylic resin particles preferably have a structure derived from a hydroxyalkyl acrylate in repeating units.

According to this constitution, it is possible to form not only urethane bonds between a recording medium and the resin, but also urethane bonds between the resin molecules. In other words, crosslinking proceeds within the bulk of a single color as well as between colors when another color is printed to be overlapped, thereby enhancing wet rubbing fastness. It is also possible to impart texture without stiffness by increasing the alkyl chain length.

In the above-described dispersion, a content of the acrylic resin particles is preferably 1% by mass or more and 50% by mass or less based on a total amount of the dispersion.

According to this constitution, discharge stability is enhanced due to suppressed increase in viscosity whereas rubbing fastness is enhanced by including a predetermined amount of the acrylic resin particles.

The above-described dispersion preferably contains a dispersant for the colorant.

According to this constitution, discharge stability is enhanced since the particle size of the pigment can be stabilized by including a dispersant for the colorant.

An ink composition for ink jet recording contains the above-described dispersion.

The ink composition for ink jet recording exhibits excellent discharge stability as well as excellent to rubbing fastness by including the dispersion according to the present disclosure.

An ink jet recording method includes an ink attaching step of discharging an ink composition for ink jet recording from a recording head, thereby attaching to a recording medium.

According to this constitution, direct recording on a recording medium is possible. Moreover, ink jet recording in a digital printing mode is readily applicable to high-mix low-volume production, for example, by eliminating printing plates required for an analog printing mode and can form high-resolution images and the like.

In the above-described ink jet recording method, the recording medium preferably has hydroxy groups on the surface.

According to this constitution, it is possible to form urethane bonds with the isocyanate groups of the acrylic resin particles, thereby enhancing wet rubbing fastness.

The above-described ink jet recording method preferably includes, after the ink attaching step, a heating step of heating the recording medium and the ink composition for ink jet recording attached to the recording medium to a heating temperature equal to or higher than a thermal dissociation temperature of the acrylic blocked isocyanate group.

According to this constitution, printing at a high printing speed is possible in the ink attaching step. Since the blocked isocyanate group can be thermally dissociated by sufficiently heating the ink that has been allowed to impact, wet rubbing fastness is enhanced.

The above-described ink jet recording method preferably heats, in the ink attaching step, the recording medium and the ink composition for ink jet recording attached to the recording medium to a heating temperature equal to or higher than a thermal dissociation temperature of the acrylic blocked isocyanate group.

According to this constitution, an apparatus can be downsized. Since the blocked isocyanate group can be thermally dissociated by heating the ink, wet rubbing fastness is enhanced.

In the above-described ink jet recording method, the heating temperature is preferably 100° C. or higher.

According to this constitution, since the thermal dissociation of the blocking agent can be promoted, wet rubbing fastness is enhanced.

What is claimed is:

1. A dispersion comprising:
   a water-insoluble colorant; and
   acrylic resin particles, wherein:
   the acrylic resin particles contain, as a monomer unit, 20 mol % or more of an acrylic blocked isocyanate group based on a total amount of the acrylic resin particles; and
   the acrylic resin particles have a weight-average molecular weight of 700,000 or more and 1,000,000 or less.

2. The dispersion according to claim 1, wherein
   a blocking agent of the acrylic blocked isocyanate group is any of pyrazole, methyl ethyl ketoxime, and caprolactam.

3. The dispersion according to claim 1, wherein
the acrylic resin particles have a structure derived from a hydroxyalkyl acrylate in repeating units.

4. The dispersion according to claim 1, wherein
a content of the acrylic resin particles is 1% by mass or more and 50% by mass or less based on a total amount of the dispersion.

5. The dispersion according to claim 1, further comprising a dispersant for the colorant.

6. An ink composition for ink jet recording, comprising the dispersion according to claim 1.

7. An ink jet recording method comprising
an ink attaching step of discharging the ink composition for ink jet recording according to claim 6 from a recording head, thereby attaching to a recording medium.

8. The ink jet recording method according to claim 7, wherein
the recording medium has hydroxy groups on a surface.

9. The ink jet recording method according to claim 8, further comprising, after the ink attaching step,
a heating step of heating the recording medium and the ink composition for ink jet recording attached to the recording medium to a heating temperature equal to or higher than a thermal dissociation temperature of the acrylic blocked isocyanate group.

10. The ink jet recording method according to claim 8, wherein
in the ink attaching step, the recording medium and the ink composition for ink jet recording attached to the recording medium are heated to a heating temperature equal to or higher than a thermal dissociation temperature of the acrylic blocked isocyanate group.

11. The ink jet recording method according to claim 9, wherein
the heating temperature is 100° C. or higher.

* * * * *